(No Model.) 2 Sheets—Sheet 1.
W. & E. MUMBRAUER.
APPARATUS FOR MEASURING AND DRAWING OFF LIQUIDS.
No. 472,625. Patented Apr. 12, 1892.
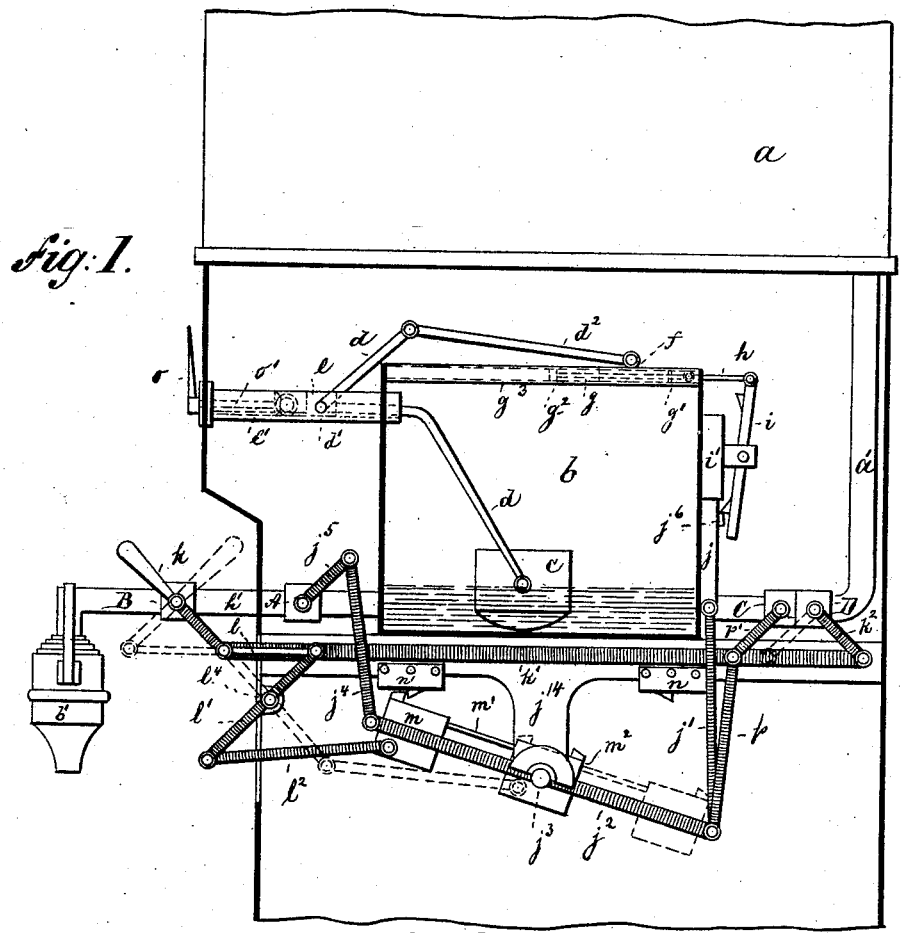
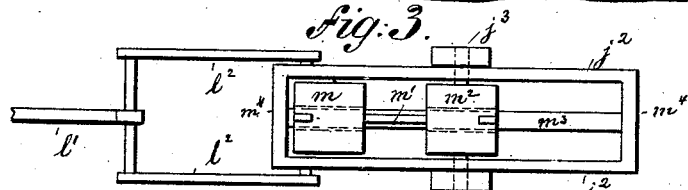
WITNESSES:
A. Schehl.
Wm. Schulz.
INVENTORS
W. & E. Mumbrauer
BY Roeder & Briesen
ATTORNEYS.

(No Model.) 2 Sheets—Sheet 2.

W. & E. MUMBRAUER.
APPARATUS FOR MEASURING AND DRAWING OFF LIQUIDS.

No. 472,625. Patented Apr. 12, 1892.

WITNESSES:
A. Schehl.
Wm. Schulz.

INVENTORS
W. & E. Mumbrauer
BY
Roeder & Briesen
ATTORNEYS

UNITED STATES PATENT OFFICE.

WILHELM MUMBRAUER AND EDMUND MUMBRAUER, OF NEW YORK, N. Y.

APPARATUS FOR MEASURING AND DRAWING OFF LIQUIDS.

SPECIFICATION forming part of Letters Patent No. 472,625, dated April 12, 1892.

Application filed December 18, 1891. Serial No. 415,467. (No model.)

*To all whom it may concern:*

Be it known that we, WILHELM MUMBRAUER and EDMUND MUMBRAUER, both of New York city, New York, have invented an Improved Apparatus for Measuring and Drawing Off Liquids, of which the following is a specification.

This invention relates to an apparatus for drawing off a measured quantity of oil or other liquid from the tank. Thus the apparatus may be set to discharge a gallon, half-gallon, quarter-gallon, or other predetermined quantity.

The invention consists in the various features of improvement more fully pointed out in the claims.

Figure 2:
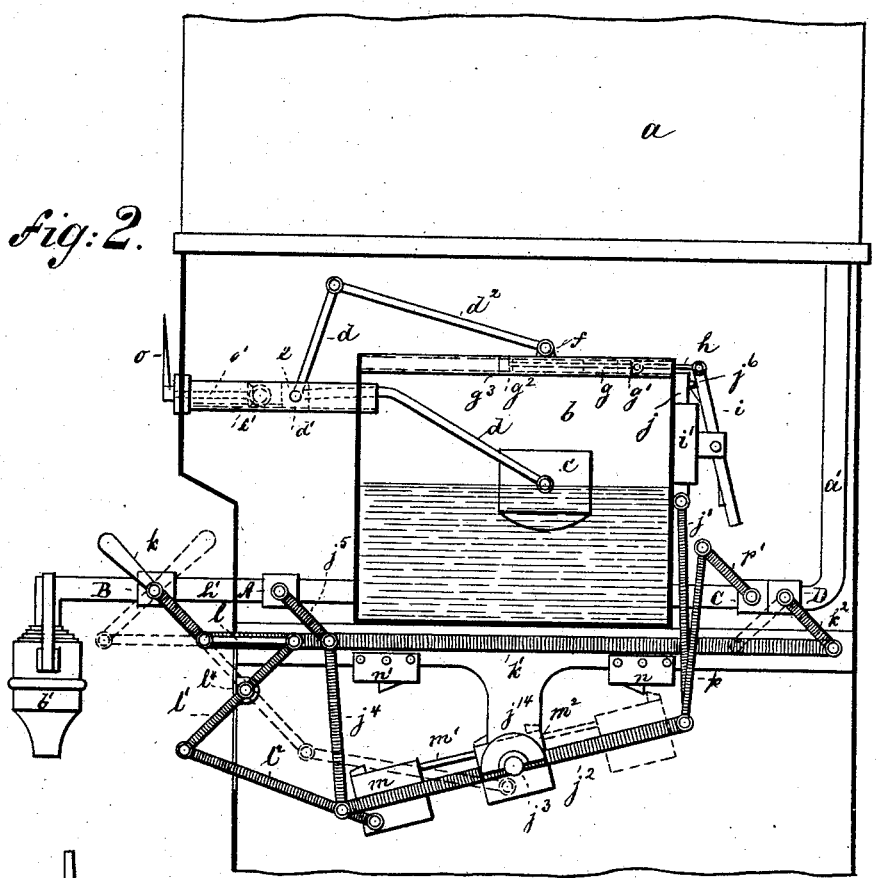
Figure 6:
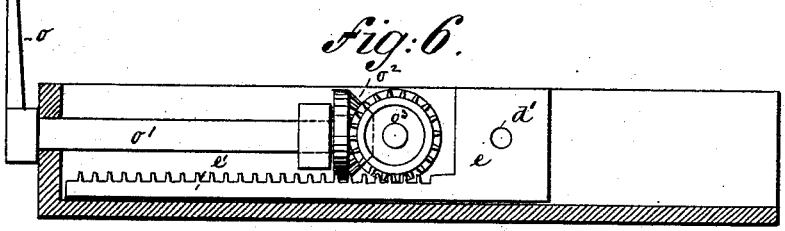
Figure 7:
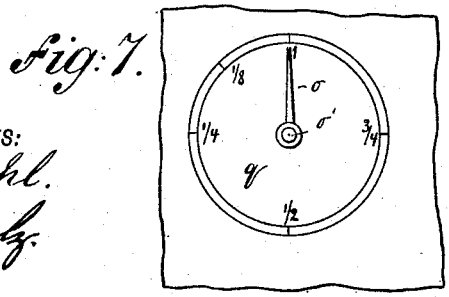

In the accompanying drawings, Figure 1 is a longitudinal section of the apparatus with both outlet-valves closed and both inlet-valves opened; Fig. 2, a similar section with one outlet-valve and one inlet-valve open and with the other outlet and inlet valves closed. Fig. 3 is a top view of the weight-carrying levers; Fig. 4, a side view of the slide; Fig. 5, a cross-section on line $x\,x$, Fig. 4; Fig. 6, a side view of the setting mechanism, and Fig. 7 a face view of the dial. Figs. 3 to 6 are drawn on a larger scale than the remaining figures.

The letter $a$ represents a tank for holding oil or other liquids and communicating by pipe $a'$ with a vessel $b$. Within this vessel there is placed a float $c$, pivotally connected to an elbow-lever $d$. This lever turns on pin $d'$ of a sliding block $e$, that may be set in manner hereinafter described. The upper arm of lever $d$ is connected by an arm $d^2$ to a slide $f$. This slide embraces a sliding rod $g$, having the heads $g'\,g^2$. The rod is movable in the direction of its length, and as the slide $f$ bears against either of the heads $g'\,g^2$ the rod is shifted or reciprocated in ways $g^3$, Fig. 5. Against the head $g'$ bears an arm $h$, pivoted to a double catch $i$, that is fulcrumed to a suitable tubular projection $i'$ of the vessel $b$. Through this tube there passes a rod $j$, to which is pivoted the upper end of rod $j'$, the lower end of which is pivoted to connected parallel levers $j^2$, turning on pivots $j^3$, journaled in a projection $j^{14}$ of vessel $b$. The forward ends of levers $j^2$ are by links $j^4\,j^5$ connected to the first outlet-valve A. This valve is placed in the outlet-pipe $h'$, that leads from vessel $b$ to the discharge-nozzle $b'$. The nozzle $b'$ we have shown telescoping, so that it may be let down to reach receiving-vessels of different heights. Within the outlet-pipe $h'$ there is located a second valve B, operated by a hand-lever $k$. To this lever there is connected by rod $k'$ and link $k^2$ the cock of a valve D in inlet-pipe $a'$. A second rod $l$ connects the hand-lever $k$ with a lever $l'$, turning on pivot $l^4$ and connected in turn by fork $l^2$ with a sliding weight $m$. This weight is by a short arm $m'$ connected to a second weight $m^2$, so that both weights move together. The weights $m\,m^2$ reciprocate upon a rail $m^3$, connected by means of the cross-pieces $m^4$ with the levers $j^2$. To these levers there is furthermore connected by links $p\,p'$ a second valve C in the inlet-pipe. Stops or catches $n\,n'$, fixed to the support $j^{14}$, retain the weights in their uppermost position and prevent them from sliding downward.

In order to set the apparatus to discharge different quantities of liquids, it is necessary to shift the block $e$ to the right or left. To this effect we employ an index-finger $o$, fixed upon a shaft $o'$, to which is secured the bevel-gear $o^2$. This bevel-gear meshes into the bevel-gear $o^3$, that in turn meshes into a rack $e'$, attached to slide $e$. As the index-finger is turned to any desired figure on a dial $q$, Fig. 7, the block $e$ will be moved in or out, as will be readily understood. Supposing the apparatus has thus been set to a fixed quantity of liquid, the operation of the device is as follows: The rear ends of the levers $j^2$ being raised and the valve A being consequently open, the lever $k$ is pushed backward (dotted lines, Fig. 2) to also open valve B, raise weights $m\,m^2$, and permit the escape of the liquid through nozzle $b'$. In this position the raised ends of levers $j^2$ through links $p\,p'$ close valve C, while the oscillation of lever $k$ through arms $k'\,k^2$ has closed valve D. The liquid will now flow out of discharge-pipe $h'$ and the float $c$ will gradually sink. When the predetermined quantity has been discharged, the sinking float will have pushed the slide $f$ so far backward that it bears against the head $g'$ of sliding rod $g$. Thus the head $g'$ will by arm $h$ tilt the catch $i$. This catch has thus far held the rod $j$ up by engaging with its upper hook a stud $j^6$ of such rod. The catch on being tilted will release rod $j$ and the weights $m\ m^2$, which are below such rod, will pull the rod downward, (dotted lines, Fig. 1.) This will cause the levers $j^2$ to turn on their pivots $j^3$ and by means of links $j^1\ j^5$ to close valve A, thus checking the further discharge of the liquid. At the same time the links $p\ p'$, drawn down by the weighted ends of levers $j^2$, will have opened the valve C. The catch $i$ will in this position bear with its lower hook on projection $j^6$ and hold the rod $j$ down. To fill the vessel $b$ with a fresh supply, the lever $k$ is now swung forward, (full lines, Fig. 1.) This will close the valve B and by rods $k'\ k^2$ open valve D. Thus the valves B A are closed and both the valves C D opened, so that the oil can enter the vessel, but cannot leave it. The turning of the hand-lever $k$ will at the same time, by the rod $l$, lever $l'$, and rod $l^2$, draw the weights $m\ m^2$ forward, the lever $l'$ turning on its pivot $l^1$. The liquid now gradually enters the vessel $b$ until when the predetermined quantity has been reached the float $c$ on rising will have moved the slide $f$ so far forward that it pushes against the head $g^2$ of sliding rod $g$. This will cause the catch $i$ to be tilted so as to release the rod $j$. Thus the weights $m\ m^2$ are free to fall, so as to push the rod $j$ upward, (full lines, Fig. 2,) which will cause the closing of cock C and cut off the further inflow of liquid. The apparatus is now recharged and ready for the next operation. We have shown two weights, because this dispenses with sliding the weight the entire length of the supporting-levers, which would be objectionable. The central weight, it will be observed, is always at the center of the apparatus, and thus out of action, while the outer weight alone does the work.

What we claim is—

1. The combination of vessel $b$ with a float $c$, a sliding rod connected therewith, a catch $i$, operated by the sliding rod, and a weighted valve-operating lever $j^2$, connected to the catch, substantially as specified.

2. The combination of vessel $b$ with a float $c$, a sliding rod connected therewith, a catch operated by the sliding rod, a valve-operating lever engaged by the catch, and a sliding weight adapted to be reciprocated along the lever, substantially as specified.

3. The combination of vessel $b$ with a float, sliding rod, and catch, and with a lever $j^2$, connected to one outlet-cock, and sliding weights connected to a second outlet-cock, substantially as specified.

4. The combination of two inlet-cocks C D and two outlet-cocks A B with oscillating lever $j^2$, connected to the cocks A C, a sliding weight $m$, connected to cock B, and with hand-lever $k$ and rods $k'\ k^2$ for connecting the cocks B D, substantially as specified.

5. The combination of vessel $b$ with float $c$, a slide $f$, connected thereto, a reciprocating rod $g$, having heads $g'\ g^2$ engaged by the slide, and with a catch $i$, operated by rod $g$ and controlling the valve-setting levers, substantially as specified.

6. The combination of vessel $b$ with float $c$, a catch $i$, operated thereby, oscillating valve-operating levers $j^2$, and with the connected weights $m\ m^2$ and retaining-catches $n\ n'$, substantially as specified.

7. The combination of vessel $b$ with float $c$, controlling the discharge-cocks, and with the lever $d$, secured to the float, and a sliding block $e$, to which the lever is pivoted, substantially as specified.

8. The combination of vessel $b$ with float $c$, controlling the discharge-cocks, and with the lever $d$, secured to the float, a sliding block $e$, to which the lever is pivoted, and with pointer $o$, bevel-gear $o^2\ o^3$, and rack $e'$ for operating the sliding block, substantially as specified.

WILHELM MUMBRAUER.
EDMUND MUMBRAUER.

Witnesses:
CLAUS VON KAMPEN,
JOHN R. FISCHBECK.